US012753084B2

(12) United States Patent
Nakajima et al.

(10) Patent No.: US 12,753,084 B2
(45) Date of Patent: Oct. 6, 2026

(54) LANTHANUM/MOLYBDENUM COMPOSITE OXIDE, ANTIBACTERIAL SINTERED COMPACT, AND ANTIVIRAL SINTERED COMPACT

(71) Applicants: TOKYO INSTITUTE OF TECHNOLOGY, Tokyo (JP); NGK SPARK PLUG CO., LTD., Nagoya (JP)

(72) Inventors: Akira Nakajima, Tokyo (JP); Takumi Matsumoto, Tokyo (JP); Mao Shoji, Nagoya (JP); Hisashi Kozuka, Nagoya (JP)

(73) Assignees: TOKYO INSTITUTE OF TECHNOLOGY, Tokyo (JP); NITERRA CO., LTD., Nagoya (JP)

( * ) Notice: Subject to any disclaimer, the term of this patent is extended or adjusted under 35 U.S.C. 154(b) by 808 days.

(21) Appl. No.: 18/001,087

(22) PCT Filed: Jun. 22, 2021

(86) PCT No.: PCT/JP2021/023547

§ 371 (c)(1),
(2) Date: Dec. 8, 2022

(87) PCT Pub. No.: WO2021/261475

PCT Pub. Date: Dec. 30, 2021

(65) Prior Publication Data

US 2023/0212021 A1 Jul. 6, 2023

(30) Foreign Application Priority Data

Jun. 22, 2020 (JP) ................................ 2020-106727

(51) Int. Cl.
*C01F 17/32* (2020.01)
*A01P 1/00* (2006.01)
*C04B 35/50* (2006.01)

(52) U.S. Cl.
CPC ................ *C01F 17/32* (2020.01); *A01P 1/00* (2021.08); *C04B 35/50* (2013.01);
(Continued)

(58) Field of Classification Search
CPC .... A01P 1/00; B01J 23/10; B01J 23/28; B01J 35/39; B01J 37/0009; B01J 37/009;
(Continued)

(56) References Cited

U.S. PATENT DOCUMENTS

| | | | |
|---|---|---|---|
| 2003/0160216 A1 | 8/2003 | Goutenoire et al. | |
| 2009/0171118 A1 | 7/2009 | Millet et al. | |
| 2011/0239825 A1 | 10/2011 | Nomura et al. | |

FOREIGN PATENT DOCUMENTS

| | | |
|---|---|---|
| WO | 2020/017493 A1 | 1/2020 |
| WO | 2020/031690 A1 | 2/2020 |

OTHER PUBLICATIONS

WO2020017493 (Year: 2020).*

(Continued)

*Primary Examiner* — Shuangyi Abu Ali

(74) *Attorney, Agent, or Firm* — Stites & Harbison, PLLC; Jeffrey A. Haeberlin; Trevor T. Graves

(57) ABSTRACT

A lanthanum molybdenum composite oxide is provided. The lanthanum molybdenum composite oxide has a primary crystal phase formed of $La_2Mo_2O_9$. The lanthanum molybdenum composite oxide also has a secondary crystal phase formed of a lanthanum molybdenum composite oxide species other than $La_2Mo_2O_9$. The secondary crystal phase may contain at least one species selected from a group consisting (Continued)

of $La_2Mo_3O_{12}$, $La_6MoO_{12}$, $La_7Mo_7O_{30}$, $La_2Mo_4O_{15}$, $La_2MoO_6$, $La_4MoO_9$, and $LaMo_2O_5$.

4 Claims, 7 Drawing Sheets

(52) U.S. Cl.
CPC ...... *C01P 2002/74* (2013.01); *C01P 2006/90* (2013.01); *C04B 2235/3227* (2013.01); *C04B 2235/3256* (2013.01); *C04B 2235/76* (2013.01)

(58) Field of Classification Search
CPC .......... B01J 37/04; B01J 37/08; B01J 37/088; C01F 17/32; C01G 39/00; C01P 2002/72; C01P 2002/74; C01P 2004/61; C01P 2006/12; C01P 2006/80; C01P 2006/90; C04B 2235/3227; C04B 2235/3256; C04B 2235/5409; C04B 2235/604; C04B 2235/6586; C04B 2235/76; C04B 2235/80; C04B 35/495; C04B 35/50; C04B 35/6262; C04B 35/62645
See application file for complete search history.

(56) References Cited

OTHER PUBLICATIONS

Lu et al., Amorphous Ceramic Material as Sulfur-Tolerant Anode for SOFC, J. Electrochem. Soc. 155 B1053(Year: 2008).*
"Synthesis of La2Mo2O9 powders with nanodomains using polyol procedure" to Sellemi et al .Ceramics International vol. 39, Issue 8, Dec. 2013, pp. 8853-8859 (Year: 2013).*
Japan Patent Office, Office Action (Notice of Reasons for Refusal) issued in corresponding Application No. JP 2020-106727, mailed Jun. 6, 2024.
Matsumoto, Takumi, et al. "Preparation of hydrophobic La2Mo2O9 ceramics with antibacterial and antiviral properties," Journal of Hazardous Materials, vol. 378, Jun. 7, 2019, 120610 (see European Search Report).
European Patent Office, Extended European Search Report issued in corresponding Application No. EP 21830284 dated Aug. 1, 2024.
Korean Intellectual Property Office, Request for the Submission of an Opinion (Examination/Search Report) issued in corresponding Application No. KR 10-2022-7038315 dated Jun. 12, 2024.
The State Intellectual Property Office of People's Republic of China, The Second Office Action issued in corresponding Application No. 202180033977.1, dated Apr. 25, 2024.
Jean-Paul Fournier, et al., "Etude des systemes La2O3-MoO3, Y2O3-MoO3 et des phases Ln6MoO12," Bulletin de la Societe Chimique de France, No. 12, 1970, pp. 4277-4283. (For relevance, see CN Office Action.).
Yinglong Huang, et al., "Preparation and Properties of New Solid Electrolyte La2Mo2O9," Journal of the Chinese Rare Earth Society, vol. 22, No. 1, pp. 113-118, Feb. 2004. (For relevance, see CN Office Action and English abstract.).
Japan Patent Office, International Search Report issued in corresponding Application No. PCT/JP2021/023547, mailed Aug. 17, 2021.
Buvat, Gaetan, et al., "Reduction Kinetics of La2Mo2O9 and Phase Evolution during Reduction and Reoxidation," Inorganic Chemistry, 2016, vol. 55, No. 5, pp. 2522-2533.
Lu, X. C., et al., "Amorphous Ceramic Material as Sulfur-Tolerant Anode for SOFC," Journal of the Electrochemical Society, 2008, vol. 155, No. 10, pp. B1053-B1057.
China National Intellectual Property Administration. Official Examination Report issued in corresponding Application No. 202180033977.1, mailed Sep. 1, 2023. (English translation not available.).
Sellemi, H., et al., Synthesis of La2Mo2O9 powders with nanodomains using polyol procedure. Ceramics International. 39 (2013) 8853-8859.

* cited by examiner

LANTHANUM/MOLYBDENUM COMPOSITE OXIDE, ANTIBACTERIAL SINTERED COMPACT, AND ANTIVIRAL SINTERED COMPACT

TECHNICAL FIELD

The present invention relates to a lanthanum molybdenum composite oxide, to an antibacterial sintered body, and to an antiviral sintered body.

BACKGROUND ART

Inorganic materials having antibacterial and antiviral properties are known. Such known inorganic materials are, for example, metallic materials such as Ag and Cu, metal oxide materials such as ZnO and CaO, and photocatalyst materials such as $TiO_2$.

However, a metallic material such as Ag has a problem in that it is easily inactivated with the passage of time. In particular, Ag is expensive and causes a cost problem. A metal oxide material has a problem in that it exhibits, for example, antibacterial property inferior to that of a metallic material. A photocatalyst material has a problem in that it cannot exhibit, for example, antibacterial property in an environment without light.

Under such circumstances, a ceramic material made of $La_2Mo_2O_9$ has conventionally been provided as a new type of inorganic material having both antibacterial and antiviral properties (see Non-Patent Document 1). $La_2Mo_2O_9$ is a composite oxide containing lanthanum and molybdenum, and has received attention as a new material having both antibacterial and antiviral properties. Lanthanum is an inexpensive and readily available material among rare earth elements.

PRIOR ART DOCUMENT

Non-Patent Document

Non-Patent Document 1: Takumi Matsumoto, et al., "Preparation of hydrophobic La2Mo2O9 ceramics with antibacterial and antiviral properties," Journal of Hazardous Materials, Elsevier Science, Netherlands, volume 378, 15 Oct. 2019, article 120610

Problem to be Solved by the Invention

Although the composite oxide containing lanthanum and molybdenum has both antibacterial and antiviral properties, there is room for further improvement in its antibacterial and antiviral properties.

SUMMARY OF THE INVENTION

An object of the present invention is to provide a lanthanum molybdenum composite oxide having excellent antibacterial and antiviral properties, and a related product thereof.

Means for Solving the Problems

The present inventors have conducted extensive studies for attaining the aforementioned object, and as a result have found that a lanthanum molybdenum composite oxide having a primary crystal phase formed of $La_2Mo_2O_9$ and a secondary crystal phase formed of a lanthanum molybdenum composite oxide species other than $La_2Mo_2O_9$ has excellent antibacterial and antiviral properties. The present invention has been accomplished on the basis of this finding.

The means for solving the aforementioned problems are as follows:

<1> A lanthanum molybdenum composite oxide comprising a primary crystal phase formed of $La_2Mo_2O_9$ and a secondary crystal phase formed of a lanthanum molybdenum composite oxide species other than $La_2Mo_2O_9$.

<2> The lanthanum molybdenum composite oxide according to <1> above, wherein the secondary crystal phase contains at least one species selected from a group consisting of $La_2Mo_3O_{12}$, $La_6MoO_{12}$, $La_7Mo_7O_{30}$, $La_2Mo_4O_{15}$, $La_2MoO_6$, $La_4MoO_9$, and $LaMo_2O_5$.

<3> The lanthanum molybdenum composite oxide according to <1> or <2> above, wherein, in an X-ray diffraction spectrum obtained through powder X-ray diffractometry, a ratio (Y/X) of a diffraction peak intensity Y to a diffraction peak intensity X is less than 1, wherein X represents an intensity of the highest diffraction peak among the diffraction peaks which are attributed to the primary crystal phase and which do not overlap with the diffraction peaks attributed to the secondary crystal phase, and Y represents an intensity of the highest diffraction peak among the diffraction peaks which are attributed to the secondary crystal phase and which do not overlap with the diffraction peaks attributed to the primary crystal phase.

<4> The antibacterial sintered body formed through sintering of the lanthanum molybdenum composite oxide as recited in any one of <1> to <3> above.

<5> The antiviral sintered body formed through sintering of the lanthanum molybdenum composite oxide as recited in any one of <1> to <3> above.

Effect of the Invention

The present invention can provide a lanthanum molybdenum composite oxide having excellent antibacterial and antiviral properties, and a related product thereof.

MODES FOR CARRYING OUT THE INVENTION

[Lanthanum Molybdenum Composite Oxide]

Figure 1:
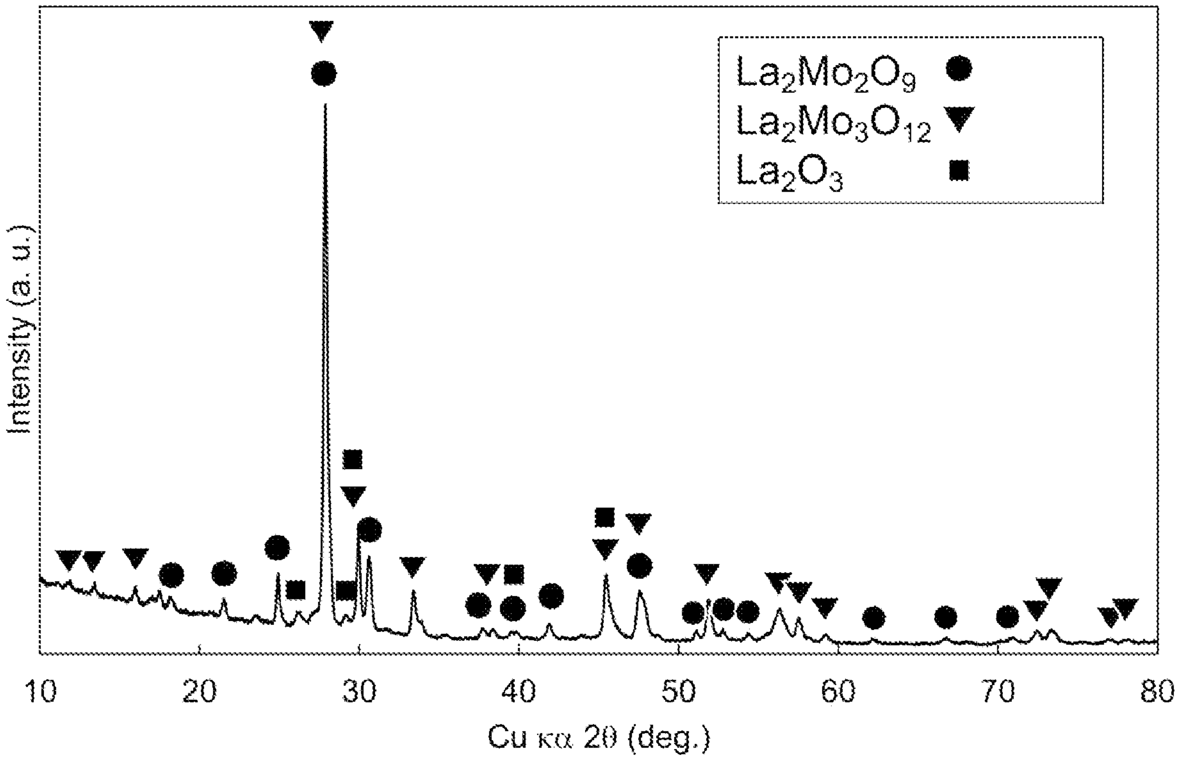
FIG. 1 is an X-ray diffraction spectrum of a lanthanum molybdenum composite oxide powder of Example 1.

The lanthanum molybdenum composite oxide of the present embodiment is a composite oxide of lanthanum (La) and molybdenum (Mo) having a primary crystal phase formed of $La_2Mo_2O_9$ and a secondary crystal phase formed of a lanthanum molybdenum composite oxide species other than $La_2Mo_2O_9$.

The lanthanum molybdenum composite oxide species other than $La_2Mo_2O_9$ (i.e., the secondary crystal phase) preferably contains at least one species selected from the group consisting of $La_2Mo_3O_{12}$, $La_6MoO_{12}$, $La_7Mo_7O_{30}$, $La_2Mo_4O_{15}$, $La_2MoO_6$, $La_4MoO_9$, and $LaMo_2O_5$.

Particularly preferably, the secondary crystal phase contains at least one species selected from the group consisting of $La_2Mo_3O_{12}$, $La_6MoO_{12}$, $La_7Mo_7O_{30}$, and $LaMo_2O_5$.

Notably, the lanthanum molybdenum composite oxide species other than $La_2Mo_2O_9$, which is contained in the secondary crystal phase of the lanthanum molybdenum composite oxide of the present embodiment, may be hereinafter referred to as "lanthanum molybdenum composite oxide secondary component." $La_2Mo_2O_9$, which is contained in the primary crystal phase of the lanthanum molybdenum composite oxide of the present embodiment, may be hereinafter referred to as "lanthanum molybdenum composite oxide primary component."

The lanthanum molybdenum composite oxide may be in the form of powder, or a sintered product of the powder.

The primary crystal phase and secondary crystal phase of the lanthanum molybdenum composite oxide may be determined through analysis of an X-ray diffraction spectrum of the lanthanum molybdenum composite oxide, which spectrum has been obtained through powder X-ray diffractometry.

As described below, the crystal phase defined by three diffraction peaks with the first to third highest intensities in the obtained X-ray diffraction spectrum is referred to as the primary crystal phase (primary phase), and the crystal phase defined by diffraction peaks other than the diffraction peaks of the primary crystal phase is referred to as the secondary crystal phase. The lanthanum molybdenum composite oxide primary component forming the primary crystal phase (i.e., $La_2Mo_2O_9$) and the lanthanum molybdenum composite oxide secondary component forming the secondary crystal phase (e.g., $La_2Mo_3O_{12}$) are characterized with reference to known X-ray diffraction spectrum data of $La_2Mo_2O_9$ and $La_2Mo_3O_{12}$, etc.

In the lanthanum molybdenum composite oxide of the present embodiment, in an X-ray diffraction spectrum obtained through powder X-ray diffractometry, a ratio (Y/X) of a diffraction peak intensity Y to a diffraction peak intensity X is less than 1, wherein X represents an intensity of the highest diffraction peak among the diffraction peaks which are attributed to the primary crystal phase and which do not overlap with the diffraction peaks attributed to the secondary crystal phase, and Y represents an intensity of the highest diffraction peak among the diffraction peaks which are attributed to the secondary crystal phase and which do not overlap with the diffraction peaks attributed to the primary crystal phase.

The lanthanum molybdenum composite oxide of the present embodiment is produced through the preparation step and firing step described below.

The preparation step is a step of preparing a powder mixture by mixing of a lanthanum compound and a molybdenum compound.

The lanthanum compound is a lanthanum (La)-containing compound necessary for the production of the lanthanum molybdenum composite oxide. Examples of the lanthanum compound include $La(OH)_3$, $La_2O_3$, and $La_2(CO_3)_3$. The lanthanum compound may be at least one species selected from a group consisting of, for example, $La(OH)_3$, $La_2O_3$, and $La_2(CO_3)_3$. The lanthanum compound is preferably $La(OH)_3$.

The molybdenum compound is a molybdenum (Mo)-containing compound necessary for the production of the lanthanum molybdenum composite oxide. Examples of the molybdenum compound include $MoO_3$, $MoO_2$, MoO, $Mo(OH)_3$, and $Mo(OH)_5$. The molybdenum compound may be at least one species selected from the group consisting of, for example, $MoO_3$, $MoO_2$, MoO, $Mo(OH)_3$, and $Mo(OH)_5$. The molybdenum compound is preferably $MoO_3$.

Preferably, the lanthanum compound and the molybdenum compound are mixed so that the ratio by mole of La to Mo is 1:1.

The lanthanum compound and the molybdenum compound are mixed together, when these compounds are in a solid phase. Specifically, the lanthanum compound and the molybdenum compound which are in a powder form may be mixed together in a powder state. Alternatively, powders of these compounds may be wet-mixed with addition of a solvent such as a lower alcohol (ethanol). The lanthanum compound and the molybdenum compound may be wet-mixed by use of, for example, alumina balls. The mixture prepared by wet mixing (i.e., wet mixture) is appropriately dried through, for example, drying by heating with hot water or spray drying.

Through this preparation step, the powder mixture of the lanthanum compound and the molybdenum compound is prepared.

The firing step is a step of firing of the powder mixture prepared in the preparation step, when the powder is in a solid phase. For example, in the firing step, the powder mixture which is in a solid form is fired at a 500° C. to 700° C. for 2 hours or longer. The firing step does not require a special synthetic air atmosphere, and is performed in air.

Through the firing step, the solid-phase lanthanum compound and the solid-phase molybdenum compound in the powder mixture are reacted with each other, to thereby prepare a powdery lanthanum molybdenum composite oxide (lanthanum molybdenum composite oxide powder) having a primary crystal phase containing $La_2Mo_2O_9$ and a secondary crystal phase containing $La_2Mo_3O_{12}$, etc.

As used herein, the aforementioned firing step, which is performed for reaction between the lanthanum compound and the molybdenum compound in the powder mixture, may be referred to as "first firing step." The first firing step is a calcination step performed before sintering of the lanthanum molybdenum composite oxide powder (i.e., a calcination step).

The lanthanum molybdenum composite oxide powder is prepared through the aforementioned firing step. The resultant lanthanum molybdenum composite oxide powder may optionally be granulated. For example, while a solvent (e.g., ethanol) is added to the lanthanum molybdenum composite oxide powder, the composite oxide powder is subjected to wet mixing/grinding using, for example, alumina balls, to thereby prepare a slurry. The slurry is dried, and the dried product is caused to pass through a sieve having a predetermined mesh size, to thereby yield lanthanum molybdenum composite oxide granules having a predetermined size.

Alternatively, the lanthanum molybdenum composite oxide powder may be sintered and may be used in the form of a sintered body. For example, the lanthanum molybdenum composite oxide powder is formed into a compact having a specific shape (e.g., cylindrical or disk shape) by means of a predetermined pressing machine. The resultant compact is fired at a predetermined temperature (e.g., 900° C. or higher), to thereby produce a sintered body of the lanthanum molybdenum composite oxide powder.

As used herein, the firing step performed for sintering of the lanthanum molybdenum composite oxide powder may be referred to as "second firing step." The second firing step, which is a main firing step to cause sintering of the lanthanum molybdenum composite oxide powder, can be performed in an air atmosphere.

The lanthanum molybdenum composite oxide of the present embodiment exhibits, in the form of powder before sintering (i.e., lanthanum molybdenum composite oxide powder), antibacterial property (antibacterial activity) and antiviral property (antiviral activity). Also, the lanthanum molybdenum composite oxide of the present embodiment exhibits antibacterial and antiviral properties even after sintering as in the case before sintering. Specific methods for evaluating the antibacterial and antiviral properties of the lanthanum molybdenum composite oxide will be described below.

The lanthanum molybdenum composite oxide exhibits antibacterial property against, for example, *Staphylococcus aureus* (Gram-positive bacterium) and *Escherichia coli* (Gram-negative bacterium). Conceivably, the lanthanum molybdenum composite oxide may exhibit antibacterial property against, for example, *Klebsiella pneumonia*, methicillin-resistant *Staphylococcus aureus, Staphylococcus epidermidis, Pseudomonas aeruginosa*, and multidrug-resistant *Pseudomonas aeruginosa.*

The lanthanum molybdenum composite oxide exhibits antiviral property against, for example, bacteriophage Qβ and bacteriophage ϕ6. Bacteriophage Qβ does not have an envelope and is known as a substitute virus for norovirus. Bacteriophage ϕ6 has an envelope and is known as a substitute virus for influenza virus. Conceivably, the lanthanum molybdenum composite oxide may exhibit antiviral property against, for example, feline calicivirus (substitute for human norovirus), human influenza virus, hog cholera virus, bovine viral diarrhea virus, border disease virus, giraffe pestivirus, coronavirus, and avian influenza virus.

Meanwhile, the lanthanum molybdenum composite oxide of the present embodiment has water repellency.

The lanthanum molybdenum composite oxide of the present embodiment may be used as is; i.e., may be used in the form of powder (lanthanum molybdenum composite oxide powder). Alternatively, the lanthanum molybdenum composite oxide powder may be incorporated into another material such as a paint or a resin. As described above, the lanthanum molybdenum composite oxide may be used in the form of a sintered body.

The present invention will next be described in more detail by way of examples, which should not be construed as limiting the invention thereto.

Example 1

(Preparation of Lanthanum Molybdenum Composite Oxide Powder Through Solid-Phase Process)

$La(OH)_3$ was provided as a lanthanum compound, and $MoO_3$ was provided as a molybdenum compound. The raw material powders of the lanthanum compound and the molybdenum compound were weighed so that the ratio by mole of La to Mo was 1:1. The weighed raw material powders were mixed with a specific amount of ethanol, and the resultant wet mixture was dried to thereby prepare a powder mixture. In the powder mixture, the solid-phase lanthanum compound is present with the solid-phase molybdenum compound.

Subsequently, the powder mixture was fired in air at 550° C. for 10 hours, to thereby cause reaction between the lanthanum compound and the molybdenum compound, and a powder of the fired product was obtained (first firing step). The fired powder was granulated through the operation described below.

Specifically, the fired powder and a specific amount of ethanol were put into a resin pot, and the resultant mixture was subjected to wet mixing/grinding using alumina balls, to thereby prepare a slurry.

Thereafter, the resultant slurry was dried at 80° C. for about 2 hours, and the dried product was caused to pass through a sieve having a mesh size of 250 m, to thereby yield a lanthanum molybdenum composite oxide powder (i.e., granulated powder) of Example 1.

(Preparation of Sintered Body)

The granulated lanthanum molybdenum composite oxide powder was subjected to press molding by means of a pressing machine (molding pressure: 98 MPa), and then subjected to CIP treatment (cold isostatic pressing treatment) at a pressure of 150 MPa, to thereby form a disk-shaped compact (diameter: 17 mm, thickness: 2.5 mm). The compact was fired in air at 900° C. for 10 hours, to thereby prepare a sintered body (second firing step). The resultant sintered body was further subjected to surface polishing, to thereby produce a disk-shaped sintered body of Example 1 (diameter: 15 mm, thickness: 2.0 mm) for evaluation of contact angle, etc. described below.

Example 2

A lanthanum molybdenum composite oxide powder of Example 2 was prepared in the same manner as employed in 1, except that the firing temperature of a powder mixture was changed to 600° C. in the production process for a granulated lanthanum molybdenum composite oxide powder. A sintered body (sintered body for evaluation) of Example 2 was produced from the lanthanum molybdenum composite oxide powder in the same manner as employed in 1.

Example 3

A lanthanum molybdenum composite oxide powder of Example 3 was prepared in the same manner as employed in 1, except that the firing temperature of a powder mixture was changed to 650° C. in the production process for granulated lanthanum molybdenum composite oxide powder. A sintered body (sintered body for evaluation) of Example 3 was produced from the lanthanum molybdenum composite oxide powder in the same manner as employed in 1.

Comparative Example 1

For Comparative Example 1, a powder and a sintered body were produced through a polymerized complex process as described in Non-Patent Document 1. The powder and sintered body of Comparative Example 1 were produced by the method according to Non-Patent Document 1 as briefly described below.

$La(NO_3)_3 \cdot 6H_2O$ (2.503 g) and $(NH_4)_6Mo_7O_{24} \cdot 4H_2O$ (1.021 g) were dissolved in distilled water (10 mL) to thereby prepare a solution. The ratio by mole of lanthanum ions to molybdenum ions was 1:1 in the solution. Subsequently, citric acid and ethylene glycol were added to the solution. The ratio by mole of metal ions (lanthanum ions and molybdenum ions) to citric acid was 1:2 in the resultant mixture. The ratio by mole of ethylene glycol to citric acid was 2:3 in the mixture.

The mixture was stirred at 80° C. for 6 hours to thereby prepare a gel-like precursor. The precursor was dried at 200° C. for 24 hours, and then the dried precursor was ground by means of a mortar and a pestle for 10 minutes. The thus-ground product was fired at 500° C. for 12 hours to thereby prepare a powder of Comparative Example 1.

(Production of Sintered Body)

Ethylene glycol (2 vol. %), serving as a binder, was added to the aforementioned powder, and the resultant mixture was subjected to uniaxial pressing at 100 MPa for 3 minutes, to thereby form a compact (pellet) having a diameter of 10 mm. The compact was fired in a specific synthetic air atmosphere at 900° C. for 12 hours, to thereby produce a sintered body. The synthetic air employed was a gas mixture of nitrogen (80%) and oxygen (20%), and was supplied at a flow rate of 1.0 L/min.

Comparative Example 2

A granulated powder of Comparative Example 2 was prepared in the same manner as employed in 1, except that the firing temperature of a powder mixture was changed to 800° C.

[Determination of Crystal Phase by Powder XRD (1)]

The powder (before sintering) obtained through the first firing step in each of Examples 1 to 3 and Comparative Example 2 was subjected to powder X-ray diffractometry (XRD) to thereby characterize a primary crystal phase and a secondary crystal phase. The measurement conditions are as follows.

<Measurement Conditions>

Measurement apparatus: powder X-ray diffractometer (apparatus name "Smart lab," product of Rigaku Corporation)

Detector: D/teX Ultra 250

Optical system: focused Bragg-Brentano geometry

X-ray output: 40 kV-30 mA

Step width: 0.02000

Scan axis: 2θ/θ

Scan range: 10.000 to 80.000

Rotation: yes

<Definition of Primary Crystal Phase and Secondary Crystal Phase>

The crystal phase defined by three diffraction peaks with the first to third highest intensities in the resultant X-ray diffraction spectrum was referred to as a primary crystal phase (primary phase), and the crystal phase defined by diffraction peaks other than the diffraction peaks of the primary crystal phase was referred to as a secondary crystal phase.

The X-ray diffraction spectra of the powders (before sintering) of Examples 1 to 3 and Comparative Example 2 are shown in FIGS. 1 to 4, and the characterization results of the crystal phases are shown in Table 1. The results of Comparative Example 1 are obtained with reference to the description in Non-Patent Document 1. The below-described evaluation results of Comparative Example 1 also obtained with reference to the description in Non-Patent Document 1.

[Impurity Content]

The powder (before sintering) obtained through the first firing step in each of Examples 1 to 3 and Comparative Example 2 was subjected to X-ray diffractometry, and the amount of impurities (formed from elements other than lanthanum and molybdenum) contained in the powder was determined on the basis of the resultant X-ray diffraction spectrum. As a result, the impurity content (as reduced to oxide) of the powder of each of Examples 1 to 3 and Comparative Example 2 was found to be 1% or less.

[Specific Surface Area of Powder]

The specific surface area ($m^2/g$) of the powder (before sintering) obtained through the first firing step in each of Examples 1 to 3 was measured according to JIS R 1626:1996 "Measuring methods for the specific surface area of fine ceramic powders by gas adsorption using the BET method." As a result, each of the lanthanum molybdenum composite oxide powders of Examples 1 to 3 was found to have a specific surface area of 3.0 $m^2/g$.

[Contact Angle]

For evaluation of the water repellency of the sintered body of each of Examples 1 to 3, the contact angle (°) of the sintered body was measured according to JIS 3257:1999 "Testing method of wettability of glass substrate." The measurement results are shown in Table 1.

[Characterization of Crystal Phase by Powder XRD (2)]

Figure 5:
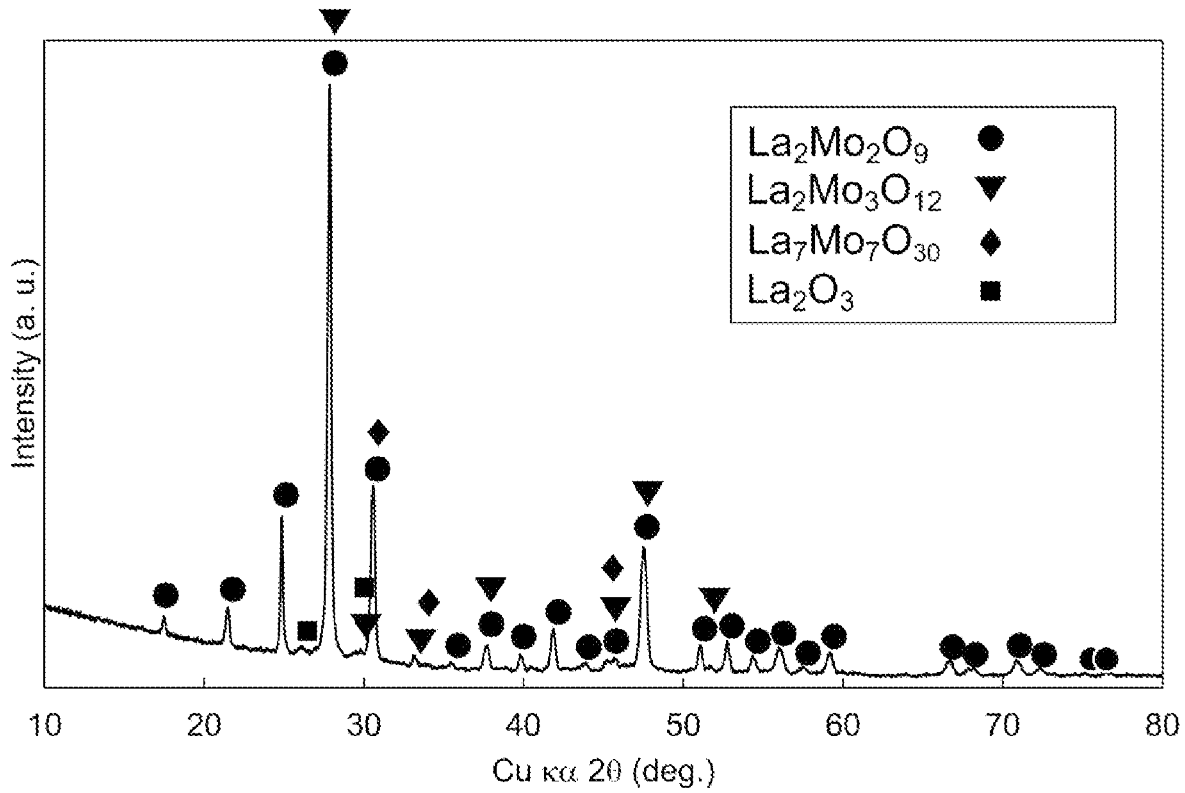
FIG. 5 is an X-ray diffraction spectrum of a sintered body of Example 1.
Figure 6:
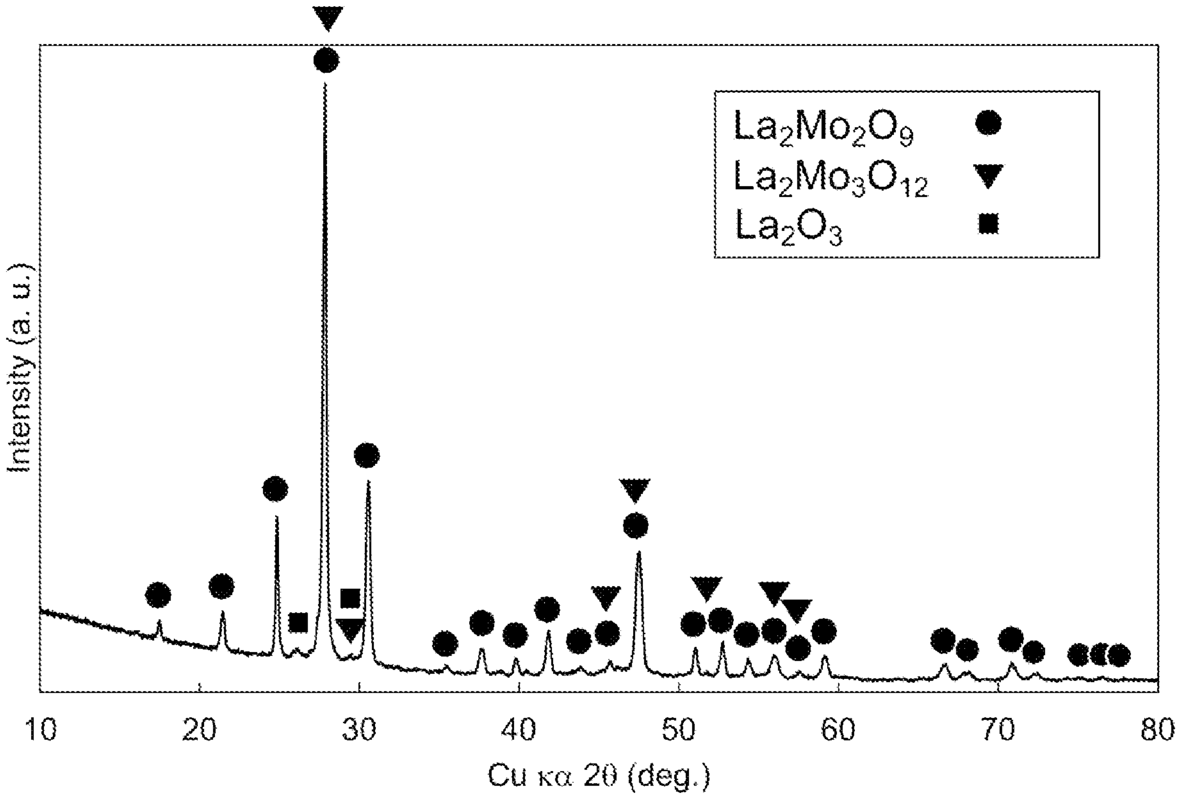
FIG. 6 is an X-ray diffraction spectrum of a sintered body of Example 2.

The sintered body of each of Examples 1 to 3 was ground by means of an agate mortar and a pestle, to thereby yield a ground product. The ground product (i.e., ground sintered body) was a powder obtained after the second firing step. The resultant ground product of each of these Examples was subjected to powder X-ray diffractometry in the same manner as described above, to thereby characterize crystal phases. The X-ray diffraction spectra of the ground products (powders) (after sintering) of these Examples are shown in FIGS. 5 and 6, and the results of characterization of the crystal phases are shown in Table 1.

[Evaluation of antibacterial performance]

The lanthanum molybdenum composite oxide powder of Example 3 was subjected to an antibacterial performance evaluation test according to JIS Z 2801:2012. Specifically, *Staphylococcus aureus* was used as a test bacterium, and the antibacterial activity value R was determined 2 hours, 4 hours, and 6 hours later. The antibacterial activity value R was determined after each action period (2, 4, or 6 hours) by use of the following formula: R=Ut−At, wherein Ut represents the logarithmic value (average) of the number of viable cells in an unprocessed test product after each action period t (2, 4, or 6 hours), and At represents the logarithmic value (average) of the number of viable cells in a processed test product after each action period t (2, 4, or 6 hours). The number of samples for each test product is 3.

The number of viable cells ($cfu/cm^2$) was counted in the case where the bacterial inoculum concentration was adjusted to $2.6\times10^6$ cfu/mL, and the amount of the bacterial inoculum per sample was adjusted to 0.1 mL.

The lower limit of detection (definition) in the antibacterial performance evaluation is as follows. When the number of viable cells after the elapse of 0 hours is represented by $N_0$, and the number of viable cells after the elapse of t hours is represented by N, the common logarithm of the cell viability $N/N_0$ is represented by $\log(N/N_0)$. In this case, t corresponds to action period. In the case of $\mathrm{Log}(N_t/N_0)-\mathrm{Log}(N_{t+2}/N_0)\leq0.5$ even if the antibacterial activity value R is 2.0 or more (i.e., R≥2.0), $\mathrm{Log}(N_t/N_0)$ or $\mathrm{Log}(N_{t+2}/N_0)$, whichever is smaller, is defined as the lower limit of detection.

The results of the antibacterial performance evaluation (time to reach the lower limit of detection, antibacterial activity value R) are shown in Table 2. In the case of $\mathrm{Log}(N_t/N_0)-\mathrm{Log}(N_{t+2}/N_0)>0.5$, the time to reach the lower limit of detection is determined as "6 hours or more" even if the lower limit of detection is not reached. In the case of $Log(N_t/N_0)-Log(N_{t+2}/N_0)\leq 0.5$, the antibacterial activity value R is denoted by "–," since it is not described in Non-Patent Document 1.

[Evaluation of Antiviral Performance]

The lanthanum molybdenum composite oxide powder of Example 3 was subjected to an antiviral performance evaluation test according to JIS R 1756:2013 "Determination of antiviral activity of photocatalytic materials under indoor lighting environment—Test method using bacteriophage." Specifically, bacteriophage Qβ was used as a test virus, and the antiviral activity value (dark place) $V_D$ was determined 2 hours, 4 hours, and 6 hours later. The antiviral activity value (dark place) $V_D$ was determined after each action period (2, 4, or 6 hours) by use of the following formula: $V_D=Log(U_D)-Log(T_D)$, wherein $Log(U_D)$ represents the logarithmic value (average) of the number of phages in an unprocessed test product after each action period (2, 4, or 6 hours), and $Log(T_D)$ represents the logarithmic value (average) of the number of phages in a processed test product after each action period (2, 4, or 6 hours). The number of samples for each test product is 3.

The number of phages (infection level) ($cfu/cm^2$) was counted in the case where the phage inoculum concentration was adjusted to $2.3\times10^7$ cfu/mL, and the amount of the phage inoculum per sample was adjusted to 0.1 mL.

The lower limit of detection (definition) in the antiviral performance evaluation is as follows. When the number of phages (infection level) after the elapse of 0 hours is represented by $N'_0$, and the number of phages (infection level) after the elapse of t hours is represented by N', the common logarithm of the phage viability $N'/N'_0$ is represented by $log(N'/N'_0)$. In this case, t corresponds to action period. In the case of $Log(N'_t/N'_0)-Log(N'_t+2/N'_0)\leq 0.5$ and an antiviral activity value $V_D$ of 3.0 or more (i.e., $V_D\geq 3.0$), $Log(N'_t/N'_0)$ or $Log(N'_t+2/N'_0)$, whichever is smaller, is defined as the lower limit of detection.

The results of the antiviral performance evaluation (time to reach the lower limit of detection, antiviral activity value $V_D$) are shown in Table 2. In the case of $Log(N'_t/N'_0)-Log(N'_t+2/N'_0)>0.5$, the time to reach the lower limit of detection is determined as "6 hours or longer," even if the lower limit of detection was not reached.

Table 2 also shows the results of the antibacterial performance evaluation (literature values) and the results of the antiviral performance evaluation (literature values) of the powder (before sintering) of Comparative Example 1 and the sintered powder (ground product of the sintered body) of Comparative Example 1.

TABLE 1

| | Synthesis process | Firing conditions (first step) Temp. (C. °) | Firing conditions (first step) Atmosphere | Firing conditions (second step) Temp. (C. °) | Firing conditions (second step) Atmosphere | Crystal phase (after first firing step) Primary crystal phase | Crystal phase (after first firing step) Secondary crystal phase | Crystal phase (after second firing step) Primary crystal phase | Crystal phase (after second firing step) Secondary crystal phase | Contact angle (°) |
|---|---|---|---|---|---|---|---|---|---|---|
| Ex. 1 | Solid-phase process | 550 | Air | 900 | Air | $La_2Mo_2O_9$ | $La_2Mo_3O_{12}$ $La_2O_3$ | $La_2Mo_2O_9$ | $La_2Mo_3O_{12}$ $La_7Mo_7O_{30}$ $La_2O_3$ | 103 |
| Ex. 2 | Solid-phase process | 600 | Air | 900 | Air | $La_2Mo_2O_9$ | $La_2Mo_3O_{12}$ | $La_2Mo_2O_9$ | $La_2Mo_3O_{12}$ $La_2O_3$ | 103 |
| Ex. 3 | Solid-phase process | 650 | Air | 900 | Air | $La_2Mo_2O_9$ | $La_2Mo_3O_{12}$ $LaMo_2O_5$ $La_2O_3$ | $La_2Mo_2O_9$ | $La_6MoO_{12}$ $La_2O_3$ | 103 |
| Comp. Ex. 1 | Polymerized complex process | 500 | Air | 900 | Synthetic air | $La_2Mo_2O_9$ | None | $La_2Mo_2O_9$ | None | 105.7 |
| Comp. Ex. 2 | Solid-phase process | 800 | Air | — | — | $LaMo_{0.98}O_{4.07}$ | $La_6Mo_8O_{33}$ $La_2O_3$ | — | — | — |

TABLE 2

| | | Specific surface area ($m^2/g$) | Antibacterial performance evaluation *Staphylococcus aureus* Time to reach the lower limit of detection | Antibacterial performance evaluation *Staphylococcus aureus* Antibacterial activity value | Antiviral performance evaluation Bacteriophage Qβ Time to reach the lower limit of detection | Antiviral performance evaluation Bacteriophage Qβ Antiviral activity value |
|---|---|---|---|---|---|---|
| Ex. 3 | Lanthanum molybdenum composite oxide powder | 3.0 | 2 hours | 4.4 | 2 hours | 5.1 |
| Comp. Ex. 1 | Powder (before sinterinq) | 6.8 | 4 hours | — | 4 hours | — |
| | Powder | 0.3 | 4 hours | — | 6 hours | — |

TABLE 2-continued

| | Specific surface area ($m^2/g$) | Antibacterial performance evaluation *Staphylococcus aureus* Time to reach the lower limit of detection | Antibacterial activity value | Antiviral performance evaluation Bacteriophage Qβ Time to reach the lower limit of detection | Antiviral activity value |
|---|---|---|---|---|---|
| (ground product of sintered body) | | | | or more | |

[Crystal Phase, Etc.]

FIG. 1 is an X-ray diffraction spectrum of the lanthanum molybdenum composite oxide powder of Example 1. As shown in FIG. 1, the lanthanum molybdenum composite oxide of Example 1 was found to have a primary crystal phase containing $La_2Mo_2O_9$ and a secondary crystal phase containing $La_2Mo_3O_{12}$ and $La_2O_3$ before sintering. As shown in FIG. 1, the ratio (Y/X) of the intensity Y to the intensity X is 1.2, wherein X represents the intensity of the highest diffraction peak (30.6°) among the diffraction peaks which are attributed to the primary crystal phase and which do not overlap with the diffraction peaks attributed to the secondary crystal phase, and Y represents the intensity of the highest diffraction peak (29.9°) among the diffraction peaks which are attributed to the secondary crystal phase and which do not overlap with the diffraction peaks attributed to the primary crystal phase.

FIG. 5 is an X-ray diffraction spectrum of the sintered body of Example 1. As shown in FIG. 5, the lanthanum molybdenum composite oxide of Example 1 was found to have a primary crystal phase containing $La_2Mo_2O_9$ and a secondary crystal phase containing $La_2Mo_3O_{12}$, $La_7Mo_7O_{30}$, and $La_2O_3$ after sintering. As shown in FIG. 5, the ratio (Y/X) of the intensity Y to the intensity X is 0.06, wherein X represents the intensity of the highest diffraction peak (24.9°) among the diffraction peaks which are attributed to the primary crystal phase and which do not overlap with the diffraction peaks attributed to the secondary crystal phase, and Y represents the intensity of the highest diffraction peak (33.1°) among the diffraction peaks attributed to the secondary crystal phase.

Figure 2:
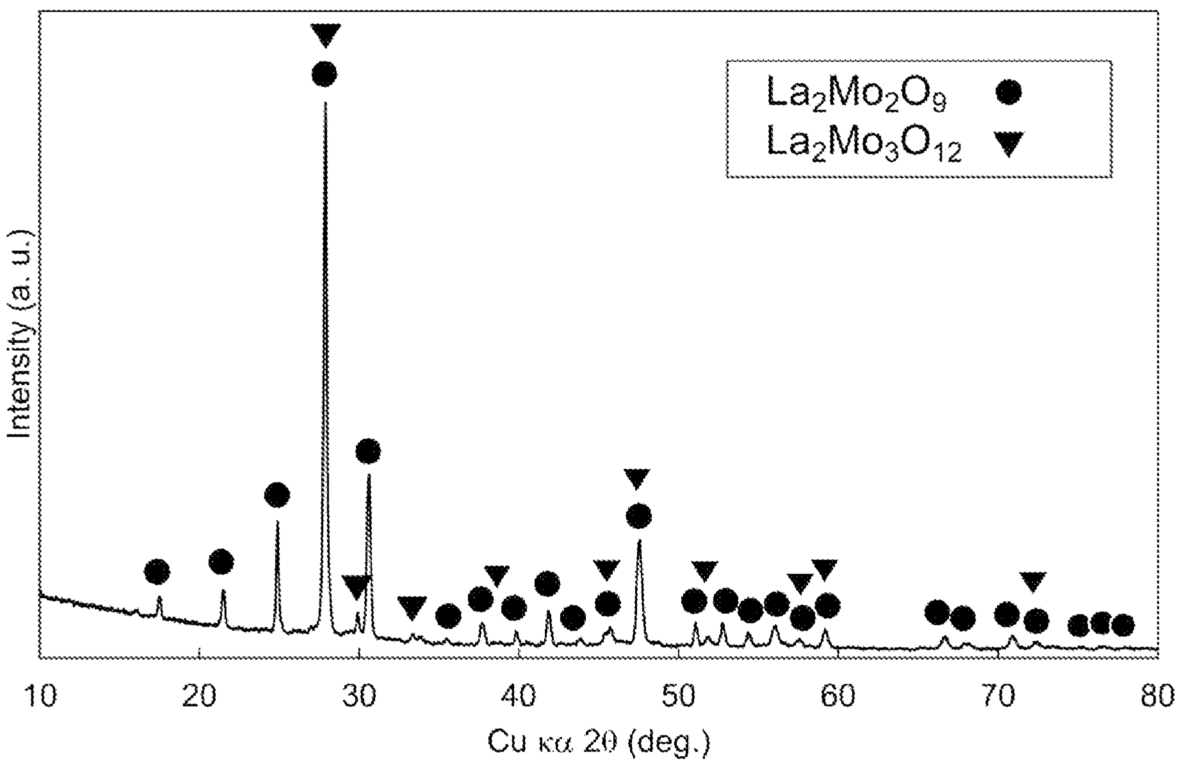
FIG. 2 is an X-ray diffraction spectrum of a lanthanum molybdenum composite oxide powder of Example 2.

FIG. 2 is an X-ray diffraction spectrum of the lanthanum molybdenum composite oxide powder of Example 2. As shown in FIG. 2, the lanthanum molybdenum composite oxide of Example 2 was found to have a primary crystal phase containing $La_2Mo_2O_9$ and a secondary crystal phase containing $La_2Mo_3O_{12}$ before sintering. As shown in FIG. 2, the ratio (Y/X) of the intensity Y to the intensity X is 0.13, wherein X represents the intensity of the highest diffraction peak (30.6°) among the diffraction peaks which are attributed to the primary crystal phase and which do not overlap with the diffraction peaks attributed to the secondary crystal phase, and Y represents the intensity of the highest diffraction peak (29.9°) among the diffraction peaks which are attributed to the secondary crystal phase and which do not overlap with the diffraction peaks attributed to the primary crystal phase.

FIG. 6 is an X-ray diffraction spectrum of the sintered body of Example 2. As shown in FIG. 6, the lanthanum molybdenum composite oxide of Example 2 was found to have a primary crystal phase containing $La_2Mo_2O_9$ and a secondary crystal phase containing $La_2Mo_3O_{12}$ and $La_2O_3$ after sintering.

Figure 3:
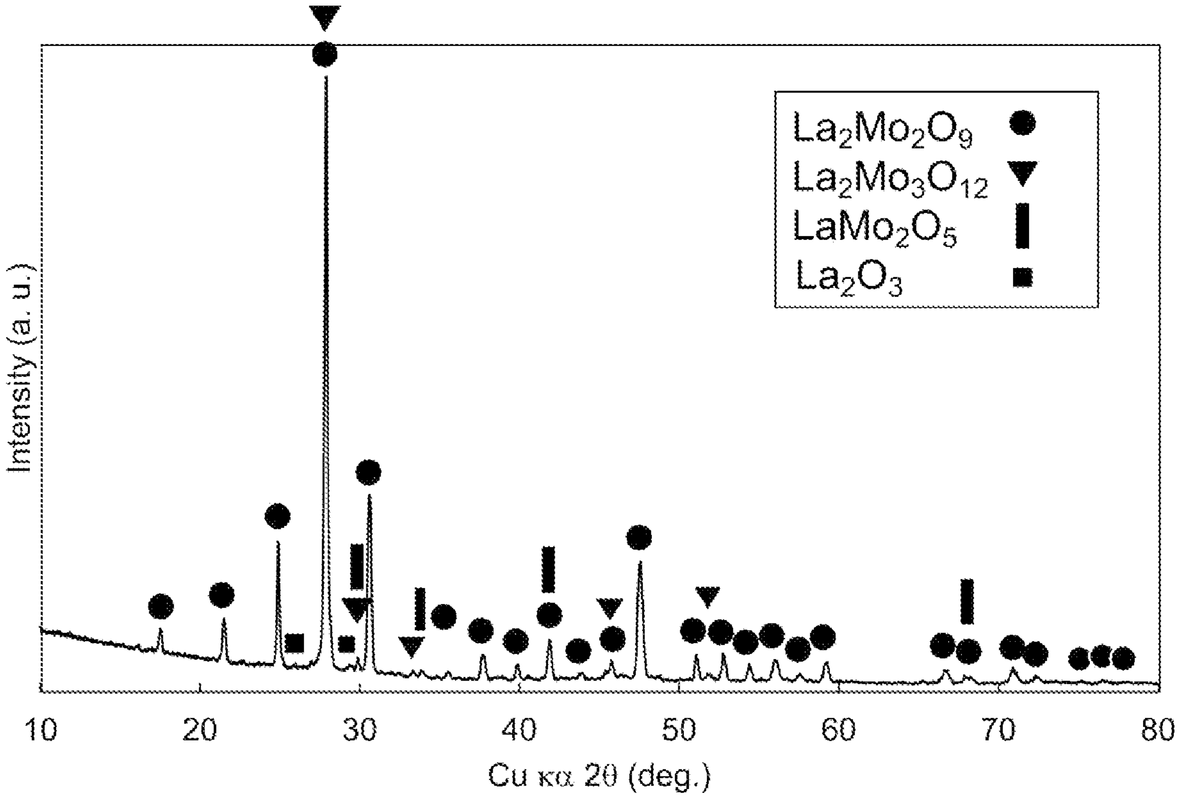
FIG. 3 is an X-ray diffraction spectrum of a lanthanum molybdenum composite oxide powder of Example 3.

FIG. 3 is an X-ray diffraction spectrum of the lanthanum molybdenum composite oxide powder of Example 3. As shown in FIG. 3, the lanthanum molybdenum composite oxide of Example 3 was found to have a primary crystal phase containing $La_2Mo_2O_9$ and a secondary crystal phase containing $La_2Mo_3O_{12}$, $LaMo_2O_5$, and $La_2O_3$ before sintering. As shown in FIG. 3, the ratio (Y/X) of the intensity Y to the intensity X is 0.08, wherein X represents the intensity of the highest diffraction peak (30.7°) among the diffraction peaks which are attributed to the primary crystal phase and which do not overlap with the diffraction peaks attributed to the secondary crystal phase, and Y represents the intensity of the highest diffraction peak (29.9°) among the diffraction peaks which are attributed to the secondary crystal phase and which do not overlap with the diffraction peaks attributed to the primary crystal phase.

Figure 7:
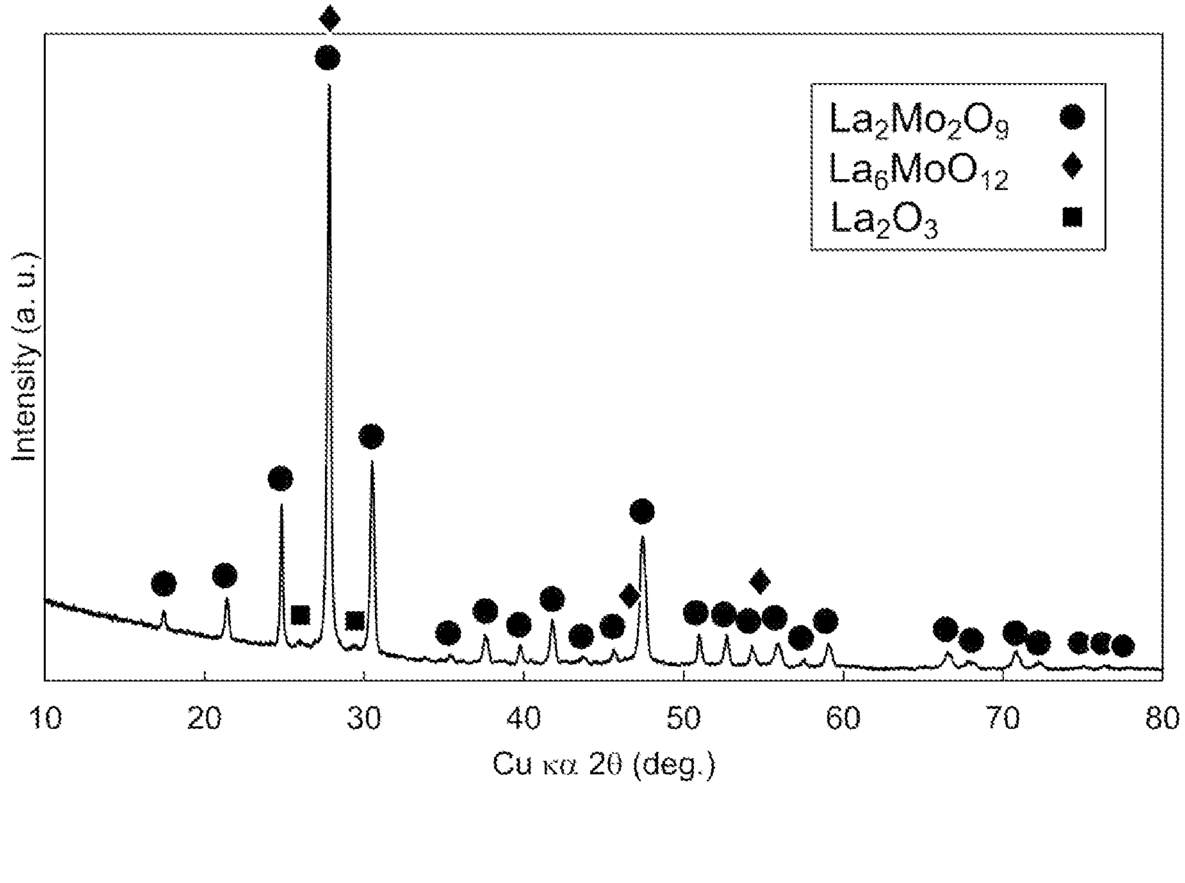
FIG. 7 is an X-ray diffraction spectrum of a sintered body of Example 3.

FIG. 7 is an X-ray diffraction spectrum of the sintered body of Example 3. As shown in FIG. 7, the lanthanum molybdenum composite oxide of Example 3 was found to have a primary crystal phase containing $La_2Mo_2O_9$ and a secondary crystal phase containing $La_6MoO_{12}$ and $La_2O_3$ after sintering.

Figure 4:
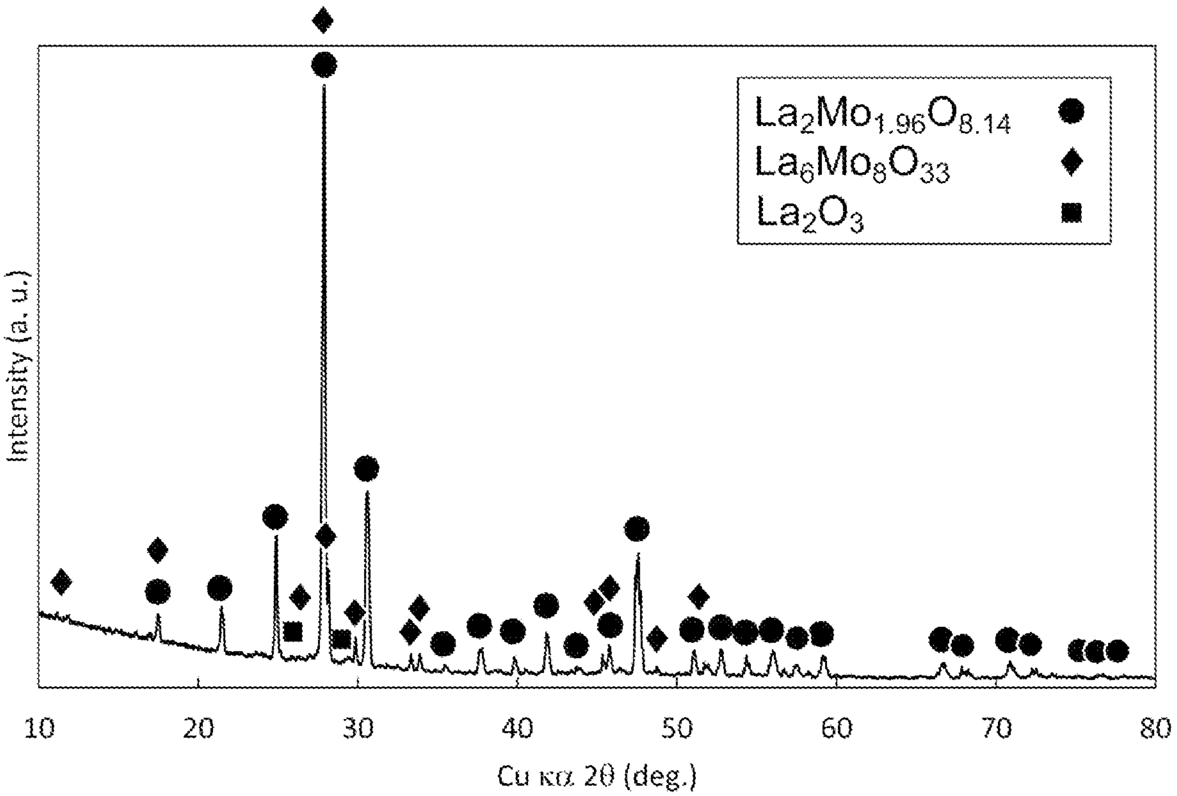
FIG. 4 is an X-ray diffraction spectrum of a lanthanum molybdenum composite oxide powder of Comparative Example 2.

FIG. 4 is an X-ray diffraction spectrum of the lanthanum molybdenum composite oxide powder of Comparative Example 2. As shown in FIG. 4, the lanthanum molybdenum composite oxide of Comparative Example 2 was found to have a primary crystal phase containing $LaMo_{0.98}O_{4.07}$ and a secondary crystal phase containing $La_6Mo_8O_{33}$ and $La_2O_3$ before sintering.

[Contact Angle]

As shown in Table 1, the sintered bodies of Examples 1 to 3 exhibited a water contact angle of 103°. Thus, the sintered bodies of Examples 1 to 3 were found to have water repellency as in the case of the sintered body of Comparative Example 1.

[Antibacterial and Antiviral Performances]

As shown in Table 2, in the case of the lanthanum molybdenum composite oxide powder of Example 1, the time to reach the lower limit of detection was 2 hours in both the antibacterial performance evaluation and the antiviral performance evaluation. In contrast, in the case of the powder (powder before sintering) of Comparative Example 1, the time to reach the lower limit of detection was 4 hours in both the antibacterial performance evaluation and the antiviral performance evaluation (see Non-Patent Document 1). Thus, the lanthanum molybdenum composite oxide powder of Example 1 was found to have antibacterial and antiviral properties superior to those of the powder of Comparative Example 1.

What is claimed:

1. A lanthanum molybdenum composite oxide comprising a primary crystal phase formed of $La_2Mo_2O_9$ and a secondary crystal phase formed of a lanthanum molybdenum composite oxide species other than $La_2Mo_2O_9$, wherein the secondary crystal phase contains at least one species selected from a group consisting of $La_6MoO_{12}$, $La_2Mo_4O_{15}$, $La_2MoO_6$, $La_4MoO_9$, and $LaMo_2O_5$.

2. The lanthanum molybdenum composite oxide according to claim 1, wherein, in an X-ray diffraction spectrum obtained through powder X-ray diffractometry, a ratio (Y/X) of a diffraction peak intensity Y to a diffraction peak intensity X is less than 1, wherein X represents an intensity of the highest diffraction peak among the diffraction peaks which are attributed to the primary crystal phase and which do not overlap with the diffraction peaks attributed to the secondary crystal phase, and Y represents an intensity of the highest diffraction peak among the diffraction peaks which are attributed to the secondary crystal phase and which do not overlap with the diffraction peaks attributed to the primary crystal phase.

3. An antibacterial sintered body formed through sintering of the lanthanum molybdenum composite oxide as recited in claim 1.

4. An antiviral sintered body formed through sintering of the lanthanum molybdenum composite oxide as recited in claim 1.

* * * * *